(12) United States Patent
Ralph et al.

(10) Patent No.: US 7,157,165 B2
(45) Date of Patent: Jan. 2, 2007

(54) IRON-BASED PEROVSKITE CATHODES FOR SOLID OXIDE FUEL CELLS

(75) Inventors: James M. Ralph, Downers Grove, IL (US); Cècile C.R. Rossignol, Lyons (FR); John T. Vaughey, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 430 days.

(21) Appl. No.: 10/716,331

(22) Filed: Nov. 18, 2003

(65) Prior Publication Data

US 2005/0106447 A1    May 19, 2005

(51) Int. Cl.
*H01M 8/00* (2006.01)

(52) U.S. Cl. .................... 429/12; 429/30; 429/32; 429/33

(58) Field of Classification Search .................. 429/12, 429/30, 32, 33
See application file for complete search history.

(56) References Cited

U.S. PATENT DOCUMENTS

| | | |
|---|---|---|
| 5,342,704 A | 8/1994 | Vasilow et al. |
| 5,453,330 A | 9/1995 | Kawasaki et al. |
| 5,604,048 A | 2/1997 | Nishihara et al. |
| 5,824,429 A | 10/1998 | Das et al. |
| 5,916,700 A | 6/1999 | Ruka et al. |
| 6,150,290 A | 11/2000 | Christiansen et al. |
| 6,287,432 B1 | 9/2001 | Mazanec et al. |
| 6,319,626 B1 | 11/2001 | Wallin et al. |
| 6,332,968 B1 | 12/2001 | Mazanec et al. |

OTHER PUBLICATIONS

Ralph et al., Electrochemical society Proceedings vol. 2001-2016 p. 466-475.*
J.C.C. Abrantes,et al., Cathodic Behviour of Nonstoichiometric (La,Sr)l-x(Co,Mn)O3 Materials (unpublished results).
J.C.C. Abrantes, et al., Electrical conductivity of La 1-xMnO3 perovskites', in Euroeramics II, 1991, vol. 3: pp. 2167-2171.
Y. Takeda, et al., Mat. Res. Bull, 1991, vol. 26: pp. 153-162.
J.A. Labrincha, et al, Reaction Between CobaltateCathodes and YSZ'in Proc. 2nd Int. Symp. Solid Ocide Fuel Cells, F. Gross,P. Zegers,S.C. Singhal and O. Yamanoto (eds), Commission European Communities Luzemborug, 1991, pp. 689-696.
S.P. Simner et al., Journal of Power Sources, 2003 , vol. 113: pp. 1-10.

(Continued)

*Primary Examiner*—Patrick Joseph Ryan
*Assistant Examiner*—Jane Rhee
(74) *Attorney, Agent, or Firm*—Emrich & Dithmar LLC

(57) ABSTRACT

An A and/or A' site deficient perovskite of general formula of $(A_{1-x}A'_x)_{1-y}FeO_{3-\delta}$ or of general formula $A_{1-x-y}A'_xFeO_{3-\delta}$, wherein A is La alone or with one or more of the rare earth metals or a rare earth metal other than Ce alone or a combination of rare earth metals and X is in the range of from 0 to about 1; A' is Sr or Ca or mixtures thereof and Y is in the range of from about 0.01 to about 0.3; δ represents the amount of compensating oxygen loss. If either A or A' is zero the remaining A or A' is deficient. A fuel cell incorporating the inventive perovskite as a cathode is disclosed as well as an oxygen separation membrane. The inventive perovskite is preferably single phase.

36 Claims, 6 Drawing Sheets

OTHER PUBLICATIONS

X. Huang et al., Journal of Alloys and Compounds, 2002, vol. 345: pp. 265-270.

S. Tanasescu, et al, "The Influence of Compositional Variables on the Thermodynamic Properties of Lanthanum Strontium Ferrite Manganites and Lanthanum Strontium Manganites", Materials Research Bulletin, vol. 32, No. 7, pp. 915-923, 1997.

F. Zeng, et al, "Phase Behavior of Lanthanum Strontium Manganites", Journal of the Electrochemical Society, 146 (8), pp. 2810-2816, 1999.

S. Badawal, et al, Chemical Diffusion in Perovskite Cathodes of Solid Oxide Fuel Cells: the Sr doped $LaMn_{1-x}M_xO_3$ (M=Co, Fe) systems, Ceramics International 27, pp. 419-429, 2001.

G. Kostogloudis, et al, "Properties of A-site-deficient $La_{0.6}Sr_{0.4}Co_{0.2}Fe_{0.8}O_{3-\delta}$-based perovskite oxides", Solid State Ionics 126, pp. 143-151, 1999.

R. Doshi, et al, "Development of Solid-Oxide Fuel Cells That Operate at 500°C", Journal of The Electrochemical Society, 146 (4), pp. 1273-1278, 1999.

L. Kindermann, et al, "Chemical compatiblity of the $LaFeO_3$ be perovskites $(La_{0.6}Sr_{0.4})zFe_{0.8}M_{0.2}O_{3-\delta}$ (z= 1, 0.9; m=Cr, Mn, Co, Ni) with yttria stabilized zirconia", Solid State Ionics 89, pp. 215-220, 1996.

D. Fagg, et al, "Redox behavior and transport properties of $La_{0.5-x}Sr_{0.5-x}Fe_{0.4}Ti_{0.6}O_{3-\delta}$ (0<x<0.1) validated by Mossbauer spectroscopy", Solid State Ionics 146, pp. 87-93, 2002.

D. Waller,et al, "The effect of thermal treatment on the resistance of LSCF electrodes on gadolinia doped ceria electrolytes", Solid State Ionics 86-88, pp. 767-772, 1996.

S. Otoshi, et al, "Changes in the Phases and Electrical Conduction Properties of $(La_{1-x}Sr_x)_{1-y}MnO_{3-\delta}$", J. Electrochem. Soc. vol. 138, No. 5, pp. 1519-1523, May 1991.

"S. Simner, et al, Development of lanthanum ferrite SOFC cathodes", Journal of Power Sources 113, pp. 1-10, 2003.

* cited by examiner

IRON-BASED PEROVSKITE CATHODES FOR SOLID OXIDE FUEL CELLS

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

This invention relates to a new ceramic particularly, but not exclusively, useful as a cathode in a solid oxide fuel cell (SOFC). A fuel cell is an energy conversion device that generates electricity and heat by electrochemically combining a gaseous fuel and an oxidizing gas via an ion conducting electrolyte. The chief characteristic of a fuel cell is its ability to convert chemical energy directly into electrical energy without the need for combustion, giving much higher conversion efficiencies than conventional thermo-mechanical methods (e.g. steam turbines). Consequently fuel cells have much lower carbon dioxide emissions than fossil fuel-based technologies for the same power output. They also produce negligible amounts of $SO_x$ and $NO_x$, the main constituents of acid rain and photochemical smog.

(SOFCs) are constructed entirely from solid-state materials; they utilize a fast oxygen ion conducting ceramic as the electrolyte, and operate in the temperature range 900–1000° C. SOFCs provide the following advantages compared with other fuel cell types:

- few problems with electrolyte management (cf liquid electrolytes, which are typically corrosive and difficult to handle);
- highest efficiencies of all fuel cells (50–60%);
- high-grade waste heat is produced, for combined heat and power (CHP) applications;
- internal reforming of hydrocarbon fuels (to produce hydrogen and methane) is possible.

A single SOFC unit consists of two electrodes (an anode and cathode) separated by the electrolyte, see FIG. 1. Fuel (usually hydrogen, $H_2$, or methane, $CH_4$) arrives at the anode, where it reacts with oxygen ions from the electrolyte, thereby releasing electrons ($e^-$) to the external circuit. On the other side of the fuel cell, oxidant (e.g. $O_2$ or air) is fed to the cathode, where it supplies the oxygen ions ($O^{2-}$) for the electrolyte by accepting electrons from the external circuit. The electrolyte conducts these ions between the electrodes, maintaining overall electrical charge balance. The flow of electrons in the external circuit provides useful power.

Today's technology employs several ceramic materials as the active SOFC components. The anode is typically formed from an electronically conducting nickel/yttria-stabilized zirconia (Ni/YSZ) cermet (i.e. a ceramic/metal composite). The cathode is based on a mixed conducting perovskite, lanthanum manganate ($LaMnO_3$) being the preferred prior art material. Yttria-stabilized zirconia (YSZ) is preferably used for the oxygen ion conducting electrolyte. To generate a reasonable voltage, fuel cells are not operated as single units but as an array of units or "stack", with a doped lanthanum chromite (e.g. $La_{0.8}Ca_{0.2}CrO_3$) interconnect joining the anodes and cathodes of adjacent units. The most common configuration is the planar (or "flat-plate") SOFC illustrated in FIG. 1.

Efforts to lower the cost of the solid oxide fuel cell (SOFC) have driven the operating temperature of the conventional SOFCs down from 1000° C. to 800° C. and lower, where less expensive and more practical metal components can be used, such as in the bipolar plate and gas manifolding. However, the lower operating temperature increases the ohmic and polarization resistances within the cell resulting in unacceptable performance losses for presently used materials. The polarization losses arise from reactions at both the anode and cathode, of which the cathode contribution is the more significant one. The conventional cathode material is strontium-doped lanthanum manganite (LSM), which is predominantly an electronic conductor with negligible oxygen ion conductivity. LSM is thermally and chemically compatible with the YSZ electrolyte and has adequate electrochemical performance at 1000° C. However, below 900° C., the polarization loss in LSM becomes too large for effective operation. It is thought that the lack of oxygen ion conductivity severely limits the performance of LSM at lower temperatures. Many studies have focused on alternative cathode materials, the most promising of which have been found in the perovskite ($ABO_3$) family. Most of the better performing cathodes contain lanthanum and strontium on the A-site, with mixtures of Co, Fe, Ni, Cu, Cr, and Mn on the B-site, for instance, see the Christensen et al. U.S. Pat. No. 6,150,290. With the exception of Cr, reaction products between the cathode and electrolyte have been observed for the remaining B-site constituents, when in contact with YSZ at temperatures of 1000° C. and above. At 800° C., Mn and Fe also show no reaction products.

Iron and cobalt-based perovskite cathodes have oxygen ion conductivities several orders of magnitude higher than LSM, which dramatically increases the reaction area for adsorption and incorporation of oxygen on the cathode. This improved mixed conductivity facilitates a greater flux of oxygen ion incorporation into the electrolyte and thus a higher current.

Previously, the ferrites (La(Sr)$FeO_3$-LSF) as cathodes on YSZ have not been described in detail. Iron has, more typically, been a dopant on the B-site of cobaltite and manganite cathodes. With the recent search for lower temperature cathodes, the ferrites have re-emerged as potential materials. Certain LSF compositions (typically when Sr-doping levels are between 20–30 mol %) show only minimal reactivity towards YSZ and relatively close thermal expansion matching. However, stoichiometric LSF does not achieve a low enough polarization resistance at 800° C. to be a useful cathode. Doping on the B-site has proved successful when using Ni and Co but reactivity with YSZ was observed even at the 20 mol % doping level, which degraded the cathode performance dramatically.

Common for the manganite perovskites is the use of a small 1–5 mol % A-site deficiency to prevent reactivity of the manganite with YSZ. By using an A-site deficient LSM cathode, the precipitation of $La_2O_3$ and SrO are dramatically reduced and very little $La_2Zr_2O_7$ or $SrZrO_3$ reaction product has been observed in these cases. Very limited studies have been performed on the cobalt-based perovskites regarding A-site deficiency suggesting that A-site deficiencies of up to 10 mol % do not prevent the reaction between the cobaltites and YSZ electrolyte. A recent study into LSF has reported similar effects to that of LSM. It is postulated that lanthanide and A-site deficiencies are compensated in the ferrite and cobaltite systems by the introduction of oxygen vacancies and some electronic defects.

A few papers discuss the effect of A-site deficiency on the electrochemical and electrocatalytic performance of manganese-based perovskite cathodes. X-ray diffraction results obtained by various groups are in close agreement and identify the limit of A-site deficiency before secondary phases start to appear at 10 mol % for $La_{1-x}MnO_3$ and progressively lower values as the Sr-doping level increases. The optimum conductivity and cathode performance for LSM have been obtained with an A-site deficiency around 5 mol %. At this relatively low A-site deficiency it is believed that the diminished reactivity toward YSZ results in the improved cathode performance and only a marginal effect derives from the improved electrochemistry.

SUMMARY OF THE INVENTION

The present invention relates to a novel low cost composition useful in intermediate temperature (600–800° C.) electrochemical applications, such as the SOFC, as well as in separation membranes and the like. This cathode material achieves acceptable performance using a simple deposition procedure. The inventive composition is designed to work with YSZ electrolytes but is not limited to YSZ and may be used with other oxide ion electrolytes. The invention uses a heavily rare earth (Ln)-deficient ferrite perovskite, which can accept deficiencies of up to approximately 30 mol %, while retaining the perovskite structure. The ability to introduce up to 30 mol % Ln-deficiency while retaining a single phase perovskite enabled significant numbers of favorable defects to be introduced that improve both the mixed conductivity and electrocatalytic performance.

SUMMARY OF THE INVENTION

It is an important object of the present invention to provide an A and/or A' site deficient perovskite of general formula of $(A_{1-x}A'_x)_{1-y}FeO_{3-\delta}$ or of general formula $A_{1-x-y}A'_xFeO_{3-\delta}$, wherein A is La alone or with one or more of the rare earth metals or a rare earth metal other than Ce alone or a combination of rare earth metals and X is in the range of from 0 to about 1; A' is Sr or Ca or mixtures thereof and Y is in the range of from about 0.01 to about 0.3; δ represents the amount of compensating oxygen loss, and wherein if either A or A' is zero the remaining A or A' is deficient.

Another object of the present invention is to provide a cathode material of an A and/or A' site deficient perovskite of general formula of $A_{1-x-y}A'_xFeO_{3-\delta}$, wherein A is La alone or with one or more of the rare earth metals or a rare earth metal other than Ce alone or a combination of rare earth metals and X is in the range of from about 0.1 to about 0.4; A' is Sr or Ca or mixtures thereof and Y is in the range of from about 0.01 to about 0.3; δ represents the amount of compensating oxygen loss, wherein the A and/or A' site deficiency is in the range of from about 5 mole % to about 30 mole %, and wherein if either A or A' is zero the remaining A or A' is deficient.

Still a further object of the present invention is to provide a solid oxide fuel cell, comprising an anode and a cathode separated by a solid electrolyte, the cathode including an A and/or A' site deficient perovskite of general formula of $(A_{1-x}A'_x)_{1-y}FeO_{3-\delta}$ or of general formula $A_{1-x-y}A'_xFeO_{3-\delta}$, wherein A is La alone or with one or more of the rare earth metals or a rare earth metal other than Ce alone or a combination of rare earth metals and X is in the range of from about 0 to about 1; A' is Sr or Ca or mixtures thereof and Y is in the range of from about 0.01 to about 0.3; δ represents the amount of compensating oxygen loss, and wherein if either A or A' is zero the remaining A or A' is deficient.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

The best measured cathode performance on YSZ has been obtained for $La_{0.6}Sr_{0.25}FeO_3$; however, others A or A' combinations are available. Using A and/or A' deficiency virtually eliminated any reaction between the cathode and YSZ electrolyte.

Although the description herein concentrates on La as the main A-site constituent rare earths are applicable to the ferrite perovskites. A variety of rare earth metals, other than Ce, can be used alone on the A-site, while any combination of rare earths may be used. Also, the A-site dopant is not limited to Sr but can include other alkaline earth metals, such as Ca or mixtures of Sr and Ca.

Figure 2:
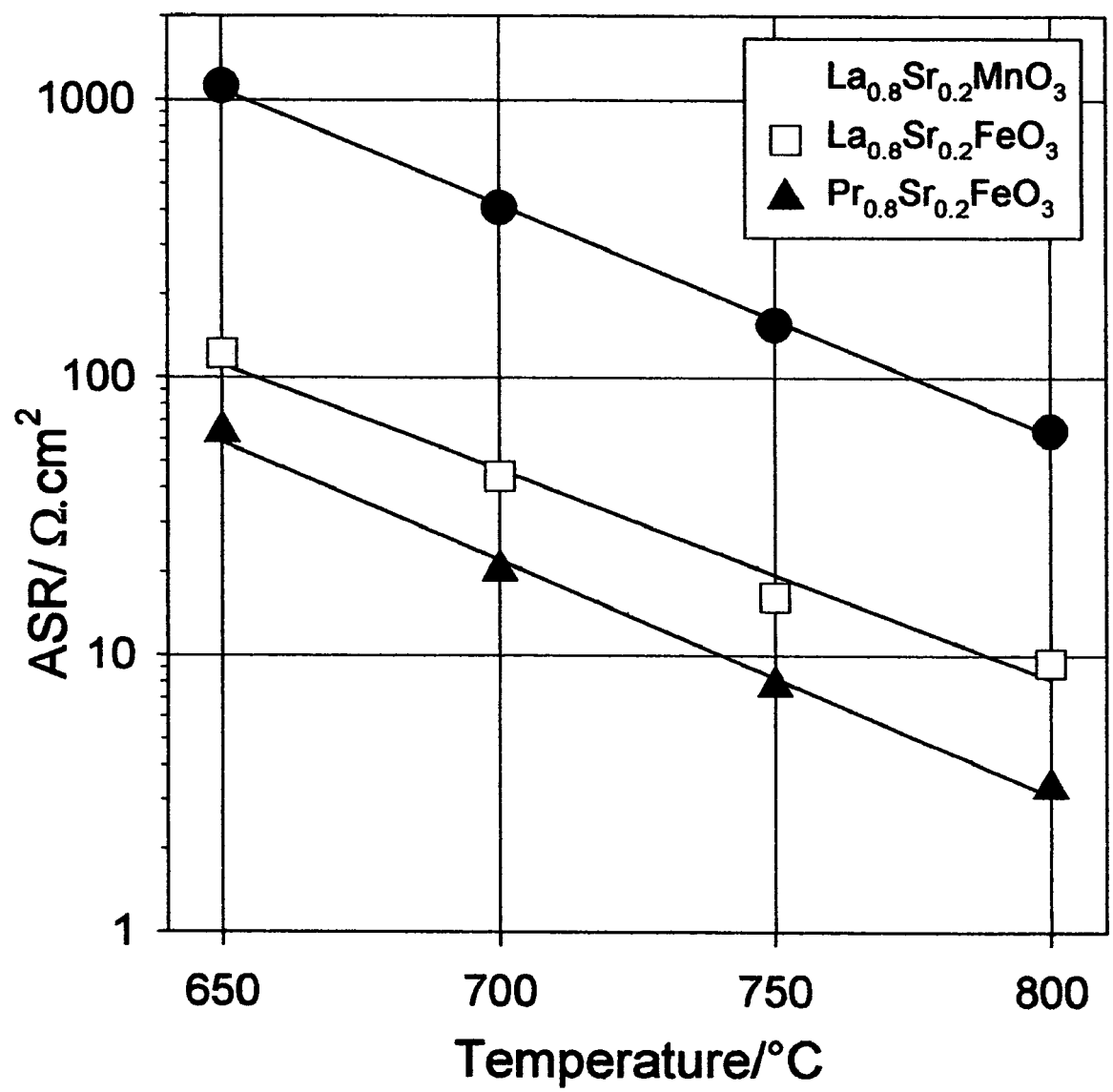
FIG. 2 is a graphical representation of area specific resistance comparisons between stoichiometric ferrite and magnatite cathodes.

Stoichiometric LSF performs considerably better than stoichiometric LSM as a cathode on YSZ at 800° C. and below. Other rare earth cations in place of La in LSF show similar improvements over LSM (see FIG. 2). However, the performance of stoichiometric LSF is not sufficient for use as an intermediate temperature (600–800° C.) electrode, for which area specific resistance (ASR) values of $1\Omega \cdot cm^2$ or less are needed.

Figure 3:
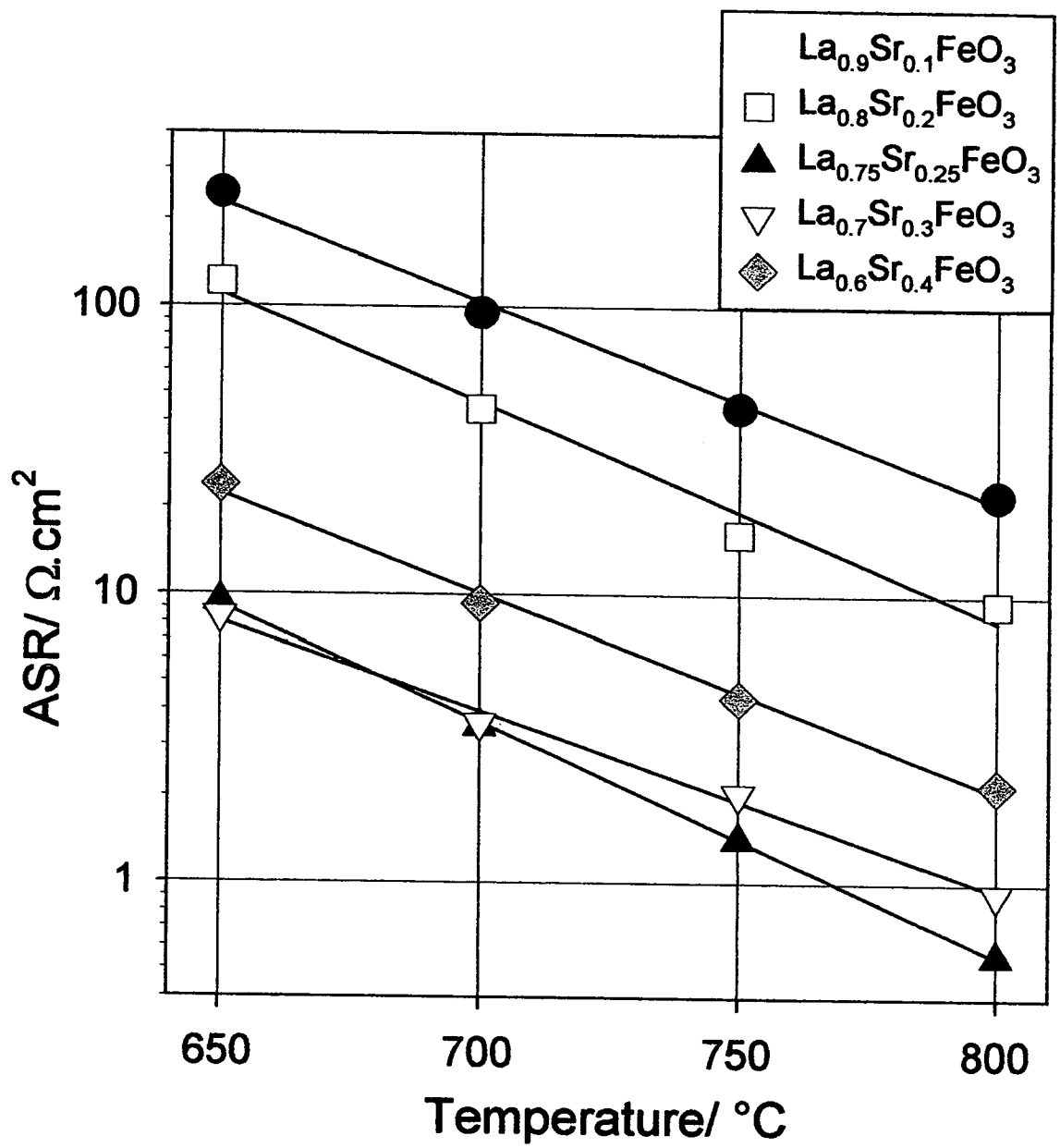
FIG. 3 is a graphical representation of the effect of strontium doping on the performance of LSF cathodes.

The typical Sr-doping level in LSM is around 20 mol %. High Sr concentrations are desirable to improve conductivity, but at 30 mol % and higher concentrations, $SrZrO_3$ reaction products are reported. A similar trend has been reported for LSF cathodes. We have found that Sr-doping produces a minimum in cathode area specific resistance (ASR) at a Sr concentration of 25 mol % (see FIG. 3). It is believed that Sr-doping around 25 mol % should produce the best performance in A and/or A-site deficient ferrite perovskite electrodes.

We have examined the influence of Ln-deficiency on the performance of ferrite cathodes on YSZ between 600–800° C. The ferrite retained a perovskite phase to approximately 20 mol % Ln-deficiency. Above this limit, X-ray diffraction measurements confirmed the existence of a second phase—$Fe_2O_3$. Reactivity testing revealed that no reaction products formed with YSZ (see Table 1), after holding intimately mixed powders of LSF and YSZ at 1200° C. for 1 week.

TABLE 1

Reaction product detected between various cathodes and YSZ.

| Composition | Observed Reactivity with YSZ |
|---|---|
| $La_{0.8}Sr_{0.2}CoO_3$ | Severe ($La_2Zr_2O_7$, $SrZrO_3$) |
| $La_{0.8}Sr_{0.2}Co_{0.8}Fe_{0.2}O_3$ | Severe ($La_2Zr_2O_7$, $SrZrO_3$ |
| $Gd_{0.8}Sr_{0.2}CoO_3$* | Slight ($SrZrO_3$) |
| $Pr_{0.8}Sr_{0.2}CoO_3$ | Moderate $Pr_2Zr_2O_7$, $SrZrO_3$. |
| $La_{0.8}Sr_{0.2}FeO_3$ | None |
| $La_{0.75}Sr_{0.25}FeO_3$ | None |
| $La_{0.7}Sr_{0.2}FeO_3$ | None |
| $La_{0.6}Sr_{0.25}FeO_3$ | None |
| $(La_{0.8}Sr_{0.2})_{0.8}FeO_3$ | None |
| $La_{0.8}Sr_{0.2}Fe_{0.8}Co_{0.2}O_3$ | Slight ($La_2Zr_2O_7$) |
| $La_{0.8}Sr_{0.2}Fe_{0.8}Ni_{0.2}O_3$ | Slight ($SrZrO_3$, $La_2Zr_2O_7$) |
| $La_{0.8}Sr_{0.2}MnO_3$ | Slight ($La_2Zr_2O_7$) |

Severe = Reaction products more prominent than cathode.
Moderate = major reaction of cathode with electrolyte.
Slight = detectable reaction of cathode with electrolyte.
none = no reaction products observed.
*Cathode annealed at 1150° C./1 week to prevent melting observed at 1200° C.

Figure 4:
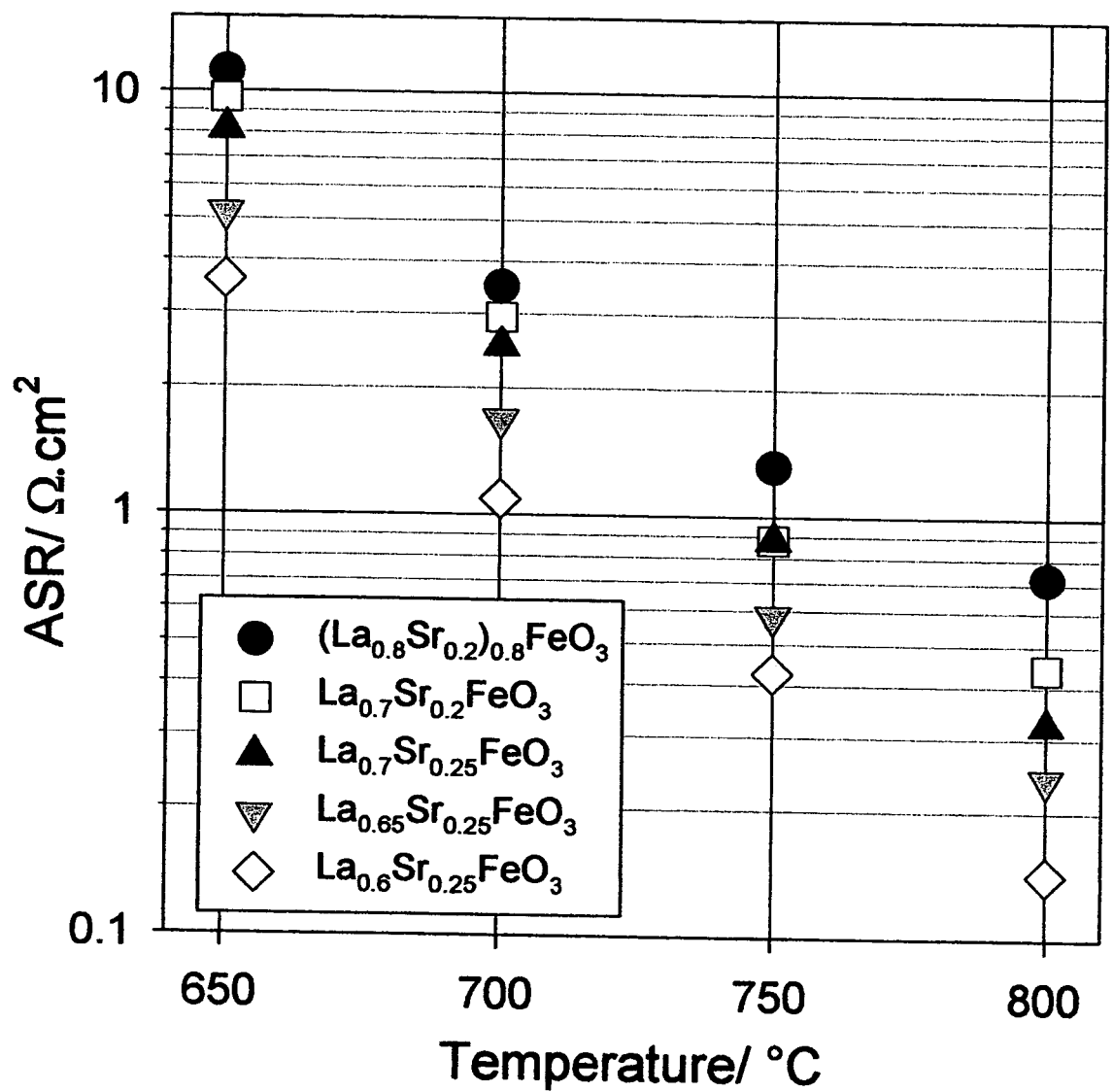
FIG. 4 is a graphical representation of the performance of La-deficient LSF with increased La-deficiency and Sr-doping.

FIG. 4 shows the ASRs for LSF with 5, 10 and 15 mol % La-deficiency and 25 mol % Sr doping, compared to a 10 mol % La-deficient LSF with 20 mol % Sr-doping and an LSF cathode with 20 mol % A-site deficiency. Clearly, Sr-doping is very important in the improvement of LSF. The 15 mol % La-deficient LSF with 25 mol % Sr achieves an acceptable cathode performance at 800° C.

We have demonstrated long term stability for La-deficient cathodes for over 500 hours. Thermal cycling between room temperature and 800° C. resulted in minimal degradation after 25 cycles. Reactivity tests have confirmed the absences of reaction products for both A-site and La-deficient LSF cathodes (see Table 1).

A rudimentary understanding of the defect chemistry responsible for the significant improvements in cathode performance has been obtained from a neutron diffraction study conducted by us. Two different LSF cathodes were examined at room temperature:

A stoichiometric LSF—$La_{0.8}Sr_{0.2}FeO_3$
A 10% La-deficient LSF—$La_{0.7}Sr_{0.2}FeO_3$ The findings from this study showed that the La-deficient LSF can better accommodate large concentrations of oxygen vacancies without oxidizing the iron. The cobaltite and manganite systems do not seem capable of accommodating such large numbers of oxygen vacancies, making the ferrite system unique among the candidate cathodes.

Figure 5:
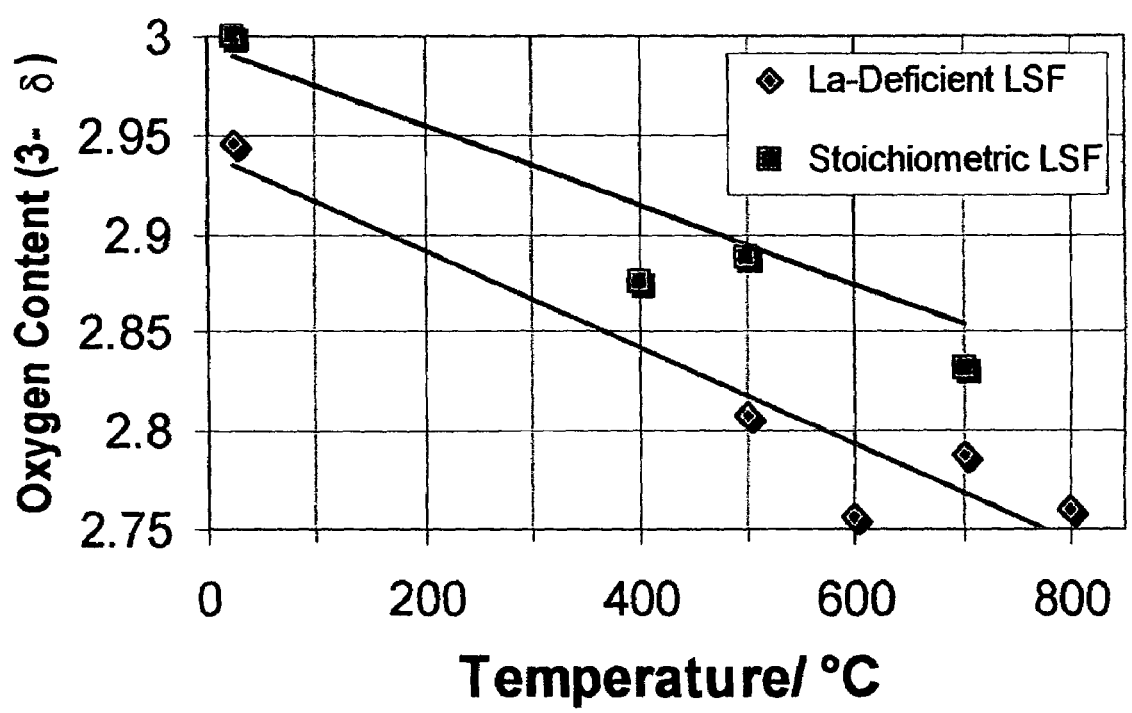
FIG. 5 is a graphical representation of the oxygen content in $La_{0.8}Sr_{0.2}FeO_{3-\delta}$ and $La_{0.7}Sr_{0.2}FeO_{3-\delta}$ calculated from high temperature neutron diffraction data.

From the room temperature neutron diffraction study it was discovered that the La-deficient LSF was able to accommodate the proposed extra oxygen vacancies introduced by the La-deficiency, by retaining the stoichiometric LSF orthorhombic structure. The orthorhombic structure has two different oxygen crystallographic sites, one of which is able to accept a large number of oxygen vacancies. A high temperature neutron diffraction study on the same two compositions used in the room temperature study was performed between 25° C. to 800° C. Both materials retained an orthorhombic structure up to 700° C. but distortion in the stoichiometric LSF was much lower with indications it was about to transform to the tetragonal structure. Both the stoichiometric and La-deficient LSF contained large numbers of oxygen vacancies at 700–800° C., proving that the strontium doping introduces oxygen vacancies in the ferrite system with little oxidation of the Fe cation. However, the oxygen vacancy concentration (or δ) was always much higher at all temperatures for the La-deficient LSF (see FIG. 5) proving that the La-deficiency LSF also primarily introduces oxygen vacancies as first proposed. In addition, the oxygen on the sites that can accept oxygen vacancies were found to be highly mobile. The dramatic improvement in cathode performance between the stoichiometric LSF and A and/or A' deficient LSF can now be attributed to the larger oxygen vacancy concentration for the A and/or A' deficient LSF, permitting much higher oxygen ion conductivities and thus increasing the surface area for the oxygen reduction reaction on the cathode.

Figure 6:
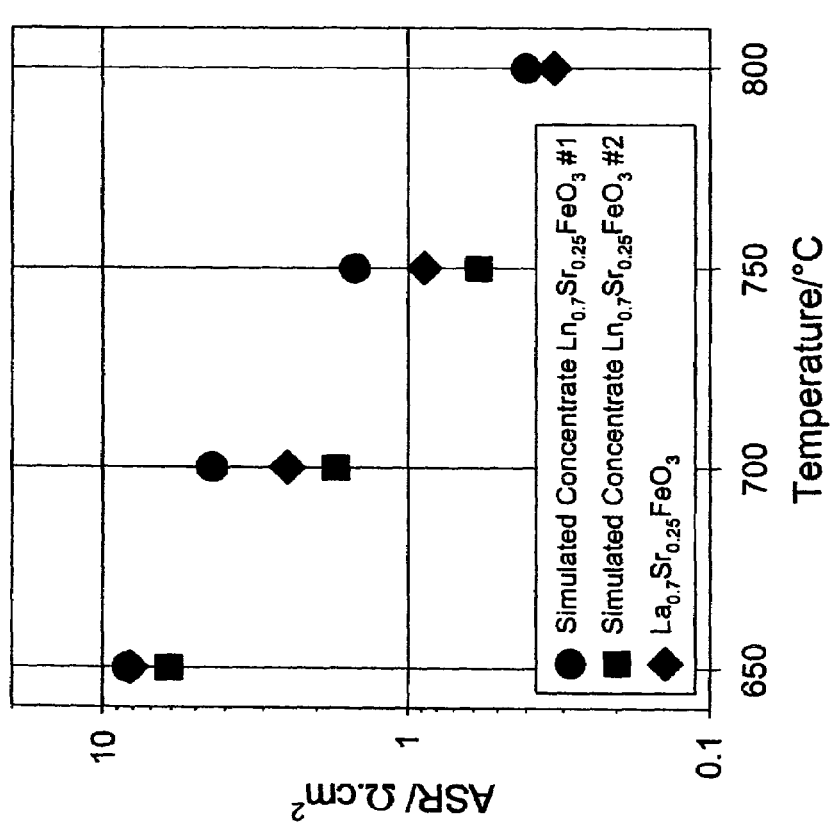
FIG. 6 is a graphical representation of lower cost ferrite cathodes.

Referring now to FIG. 6, there is shown data accumulated for impure La compounds. Although previous experiments have been conducted with substantially pure La, simulated concentrates of La have shown to be nearly as effective in ASR values at temperature as substantially pure La. The simulated concentrates of rare earths are in the first case 68.7% La, 3.4% Ce, 4.7% Pr and 23.2% Nd. Similar results if not better, were obtained with 63.5% La, 6.35% Ce, 8.73% Pr and 22.5% Nd. Generally, at least 60% by weight La is preferred, as all of the above percentages are weight percents.

Generally, this invention. as previously illustrated, includes both rare earth deficient and A' deficient materials, noted as A for the rare earth and A' for the doping material. In the case where A is zero, then the A' site is deficient. As indicated above, insofar as the rare earths are concerned, any rare earth can be used alone other than Ce and any combination of rare earths may be used. Insofar as the doping material is concerned, the invention is preferably limited to Sr, Ca or mixtures thereof. In all cases, iron is used in the B site and is the transition metal of choice in the invention. The δ refers to the amount of compensating oxygen loss or oxygen deficiencies.

Although the invention has been described principally with respect to a cathode and a solid oxide fuel cell, the inventive material may also be used as a separation membrane for transmitting oxygen at pressure differentials at each side of the membrane when used with a ceramic separation membrane. Combinations of the inventive material may be used as either anode or cathode.

Figure 1:
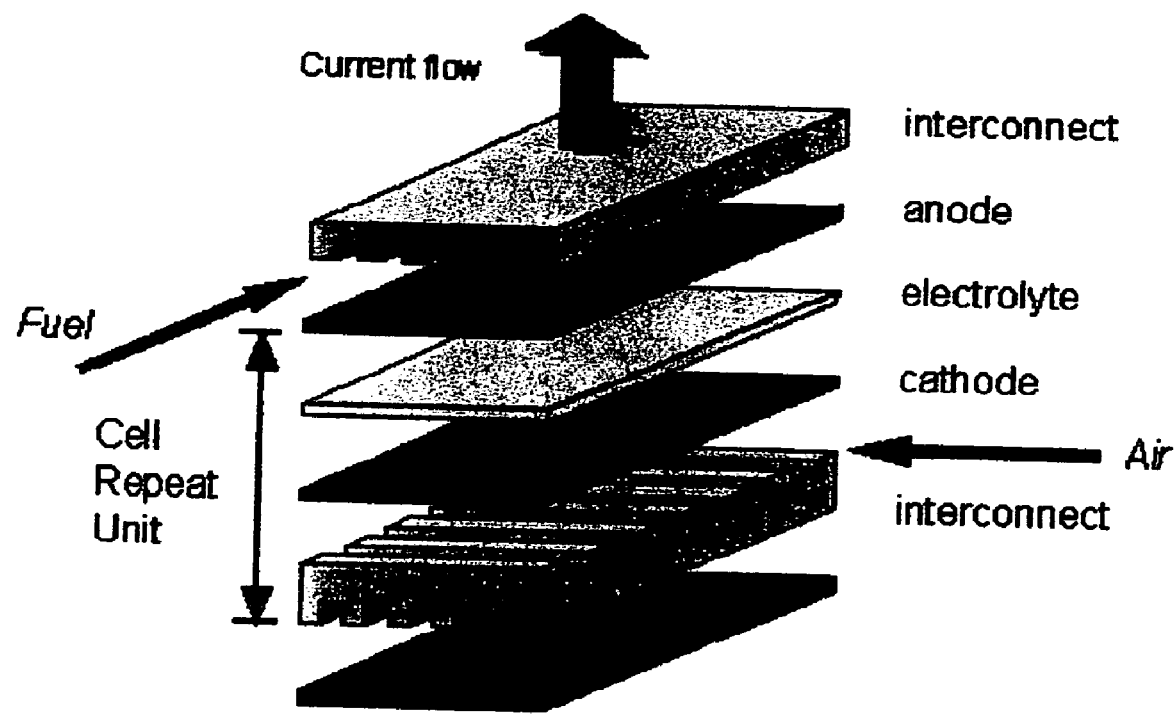
FIG. 1 is an exploded view of a prior art SOFC.

Although yttria stabilized zirconia has been described with respect to electrolytes herein, other well know electrolytes including but not limited to doped ceria, doped lanthanum galate and doped bismuth oxide are well known and may be used instead of or in combination with the yttria stabilized zirconia previously referenced. Although a specific interconnect material has been described in the background of the present invention, the invention is intended to include any well known interconnect material, either presently existing or in the future. Further, although a planar or flat plate SOFC has been illustrated for purposes of the preferred embodiment in FIG. 1, any fuel cell in which the inventive material may be incorporated, irrespective of geometry, is included in the invention described herein. As previously stated, doping with strontium or calcium or mixtures thereof is preferably in the range of from 5 mole % to about 30 mole % while a more preferred range is 15 mole % to about 25 mole % and for A and/or A' site deficiency, the most preferred concentration is about 15 mole %. For the preferred embodiment in which A is at least 60% La and is present in about 0.6 mole fraction, A' is Sr and is present at about 0.25 mole fraction. Moreover, although disclosed A may be present as $A_{1-x}$ wherein X is in the range of between 0 and 1, the preferred X value is about 0.1 to about 0.4. Insofar as A' deficiency values of 1-y, y is defined most broadly as 0.01 to about 0.3; however, the most preferred concentration is 0.1 to about 0.2 and for Sr the most preferred concentration is 0.25 in combination with the 0.6 mole fraction of at least 60% by weight La.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. An A and/or A' site deficient perovskite of general formula of $(A_{1-x}A'_x)_{1-y}FeO_{3-\delta}$ or of general formula $A_{1-x-y}A'_xFeO_{3-\delta}$, wherein A is La alone or with one or more of the rare earth metals or a rare earth metal other than Ce alone or a combination of rare earth metals and X is in the range of from 0 to about 1; A' is Sr or Ca or mixtures thereof and Y is in the range of from about 0.01 to about 0.3; δ represents the amount of compensating oxygen loss, and wherein if either A or A' is zero the remaining A or A' is deficient.

2. The perovskite of claim 1, wherein X is in the range of from about 0.1 to about 0.4.

3. The perovskite of claim 1, wherein A' is present in the range of from about 0.15 to about 0.30.

4. The perovskite of claim 1, wherein A is La and one or more of Ce, Pr, Nd, Sm, Gd, and Y.

5. The perovskite of claim 1, wherein A is La and one or more of Ce, Pr, and Nd.

6. The perovskite of claim 1, wherein A is at least 60% La.

7. The perovskite of claim 1, wherein A is substantially all La.

8. The perovskite of claim 1, wherein A' is Sr.

9. The perovskite of claim 1, wherein the A and/or A' site deficiency is in the range of from about 5 mole % to about 30 mole %.

10. The perovskite of claim 1, wherein the A and/or A' site deficiency is in the range of from about 10 mole % to about 20 mole %.

11. The perovskite of claim 1, wherein the area specific resistance (ASR) is less than about 0.2 ohms·cm$^2$ at 800° C.

12. The perovskite of claim 1, wherein A is at least 60% La present at about 0.6 mole fraction and A' is Sr present at about 0.25 mole fraction.

13. The perovskite of claim 1, wherein the perovskite is substantially single phase.

14. The perovskite of claim 1, functioning as an anode or a cathode adjacent to and in contact with a solid electrolyte.

15. The perovskite of claim 1 in the form of a membrane and further including mechanism for establishing an oxygen partial pressure gradient across said membrane.

16. The perovskite of claim 1 in the form of an electrode in combination with an oxygen ion conducting membrane.

17. A cathode material of an A and/or A' site deficient perovskite of general formula of $A_{1-x-y}A'_xFeO_{3-\delta}$, wherein A is La alone or with one or more of the rare earth metals or a rare earth metal other than Ce alone or a combination of rare earth metals and X is in the range of from about 0.1 to about 0.4; A' is Sr or Ca or mixtures thereof and Y is in the range of from about 0.01 to about 0.3, δ represents the amount of compensating oxygen loss, wherein the A and/or A' site deficiency is in the range of from about 5 mole % to about 30 mole %, and wherein if either A or A' is zero the remaining A or A' is deficient.

18. The perovskite of claim 17, wherein A is La and one or more of Ce, Pr, Nd, Sm, Gd, and Y.

19. The perovskite of claim 17, wherein A is La and one or more of Ce, Pr, and Nd.

20. The perovskite of claim 17, wherein A is at least 60% by weight La.

21. The perovskite of claim 17, wherein A is substantially all La.

22. The perovskite of claim 17, wherein A' is Sr.

23. The perovskite of claim 22, wherein A' is present in the range of from about 0.15 to about 0.30.

24. The perovskite of claim 23, wherein the A and/or A' site deficiency is in the range of from about 10 mole % to about 20 mole %.

25. The perovskite of claim 24, wherein the area specific resistance (ASR) is less than about 0.2 ohms·cm$^2$ at 800° C.

26. The perovskite of claim 25, wherein A is at least 60% by weight La present at about 0.6 mole fraction and A' is Sr present at about 0.25 mole fraction.

27. The perovskite of claim 17, wherein A is at least 60% La, A' is Sr, Y is in the range of from about 0.05 to about 0.3 and the perovskite is substantially single phase.

28. A solid oxide fuel cell, comprising an anode and a cathode separated by a solid electrolyte, said cathode including an A and/or A' site deficient perovskite of general formula of $(A_{1-x}A'_x)_{1-y}FeO_{3-\delta}$ or of general formula $A_{1-x-y}A'_xFeO_{3-\delta}$, wherein A is La alone or with one or more of the rare earth metals or a rare earth metal other than Ce alone or a combination of rare earth metals and X is in the range of from about 0 to about 1; A' is Sr or Ca or mixtures thereof and Y is in the range of from about 0.01 to about 0.3; δ represents the amount of compensating oxygen loss, and wherein if either A or A' is zero the remaining A or A' is deficient.

29. The solid oxide fuel cell of claim 28, wherein the electrolyte is one or more of yttria stabilized zirconia, doped ceria, doped lanthanum gallate, and doped bismuth oxide.

30. The solid oxide fuel cell of claim 28, wherein the electrolyte is yttria stabilized zirconia.

31. The solid oxide fuel cell of claim 30, wherein the area specific resistance (ASR) of the cathode is less than about 0.2 ohms·cm$^2$ at 800° C.

32. The solid oxide fuel cell of claim 31, wherein A is at least 60% La and X is in the range of from about 0.1 to about 0.4 and A' is Sr.

33. The solid oxide fuel cell of claim 32, wherein A is at least 60% La present at about 0.6 mole fraction and A' is Sr present at about 0.25 mole fraction.

34. The solid oxide fuel cell of claim 33, wherein the cathode is substantially single phase.

35. A stack of a plurality of the solid oxide fuel cells of claim 28, wherein each fuel cell is separated from an adjacent fuel cell by an interconnect material and at least some of the cells are connected in series.

36. The stack of claim 35, wherein at least some of the cathodes are A and/or A' site deficient, A is at least 60% La, X is in the range of from about 0.1 to about 0.4 and A' is Sr.

* * * * *

UNITED STATES PATENT AND TRADEMARK OFFICE
CERTIFICATE OF CORRECTION

| | |
|---|---|
| PATENT NO. | : 7,157,165 B2 |
| APPLICATION NO. | : 10/716331 |
| DATED | : January 2, 2007 |
| INVENTOR(S) | : James M. Ralph, Cecile C.R. Rossignol and John T. Vaughey |

It is certified that error appears in the above-identified patent and that said Letters Patent is hereby corrected as shown below:

Page 2, under heading "Other Publications", column 1, line 16, delete "$O_{3-8}$" and insert --$O_{3-\delta}$--;

Column 2, line 2 delete "$O_{3-8}$" and insert --$O_{3-\delta}$--;

Column 2, line 6, delete "$O_{3-8}$" and insert --$O_{3-\delta}$--.

Signed and Sealed this

Eighth Day of May, 2007

JON W. DUDAS
*Director of the United States Patent and Trademark Office*